2,908,730

SOLVENT EXTRACTION SEPARATION OF A METHYLENE CHLORIDE-PARAFFINIC HYDROCARBON MIXTURE

Robert C. Binning and Joseph F. Jennings, Texas City, Tex., assignors to The American Oil Company, Texas City, Tex., a corporation of Texas No Drawing. Application August 28, 1958
Serial No. 757,683

6 Claims. (Cl. 260—676)

This invention relates to the separation of organic compounds, and particularly concerns their separation by means of a solvent extraction process.

The present invention concerns separating methylene chloride from a mixture of methylene chloride with a paraffinic hydrocarbon. This separation is effected by solvent extracting the mixture with a liquid solvent corresponding to the formula

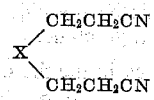

wherein X is an atom selected from the group consisting of oxygen and sulfur. The above formula embraces $\beta,\beta'$-oxydipropionitrile and $\beta,\beta'$-thiodipropionitrile as the selective solvents employed. Upon solvent extraction, an extract phase of solvent containing dissolved methylene chloride and a raffinate phase of paraffinic hydrocarbon are obtained. The extract and raffinate phases are separated and the solvent may be recovered from the extract phase and reused in the extraction step.

Mixtures of methylene chloride with various paraffinic hydrocarbons such as the normally liquid aliphatic paraffinic hydrocarbons may be separated by extraction with the solvent employed in this invention. The invention is particularly useful for separating methylene chloride from mixtures of methylene chloride with aliphatic paraffinic hydrocarbons having from about 5 to 8 carbon atoms. A special need exists for separating methylene chloride from close boiling paraffins, particularly from azeotropic compositions which it forms with paraffinic hydrocarbons, for example azeotropic compositions of methylene chloride and dimethylbutanes.

An illustration of one situation wherein the invention has particular application is as follows. To improve the octane number of the pentane and hexane fractions of gasoline, petroleum refiners have developed processes to isomerize the straight chain paraffins to branched chain paraffins. From n-hexane, a product consisting of dimethylbutanes (diisopropyl and neohexane), methylpentanes (2- and 3-methylpentanes) and n-hexane is produced. Since the dimethylbutanes have very high octane numbers (diisopropyl has an F-1 clear octane of 103 and neohexane has an F-1 clear octane of 92), it is desirable to separate them from their methylpentane isomers (which have an F-1 clear octane of 73-75) and n-hexane which has the very low octane number of 25 F-1 clear. It has heretofore been found that the isomeric mixture of hexanes from the isomerization step can be azeotropically distilled with methylene chloride to produce an overhead azeotropic mixture of methylene chloride and dimethylbutanes. While the azeotrope of methylene chloride with neohexane boils at about 37° C. and contains about 75 weight percent methylene chloride, practical azeotropic distillations which employ excess amounts of the entrainer will produce overhead azeotropes containing more than the stated amount of methylene chloride, depending upon the extent of recovery of the dimethylbutanes from the other isomeric hexanes which is desired. This enables separation of the high octane components from the low octane components. However it has been found exceedingly difficult, from a practical standpoint, to separate the methylene chloride from the dimethylbutanes which are removed overhead from the azeotropic distillation step. The present invention provides a highly efficient method for effecting the separation of methylene chloride from the dimethylbutanes.

The selective solvents employed herein are $\beta,\beta'$-oxydipropionitrile or $\beta,\beta'$-thiodipropionitrile. The former compound is a colorless liquid having a melting point of $-26.3°$ C., a boiling point of 120° C. (1 mm.), a specific gravity of 1.0405 (30° C.) and a viscosity (30° C.) of 8.00 cps. At temperatures above 175° C. it is somewhat unstable. $\beta,\beta'$-Thiodipropionitrile has a melting point of 28.65° C. and a specific gravity (30° C.) of 1.1095.

In liquid-liquid extraction temperatures within the range of $-20$ to 150° C., generally between 0° and 50° C., are employed when using the $\beta,\beta'$-oxydipropionitrile as the selective solvent. When using $\beta,\beta'$-thiodipropionitrile as the selective solvent, extraction temperatures of about 30° to 100° C. are employed. When practically feasible it is usually preferred to employ temperatures as close to the ambient temperature as is possible. Since the extraction is carried out under liquid conditions, sufficient pressure is maintained on the system to insure liquid phase operations. The selective solvent is employed in an amount sufficient to cause the formation of two separation phases. The proportion of solvent may be from 0.1 to 10 volumes or more per volume of feed mixture which is to be separated. Ordinarily, from 0.5 to 5 volumes of solvent per volume of feed mixture are used. The extraction may be carried out in the presence of a small amount of water, e.g. 1 to 10% to increase the selectivity of the extraction. Diluents or auxiliary solvents may also be employed, and antisolvents may also be used. The extraction can be carried out employing conventional solvent extraction techniques. Thus it can be carried out in batch, continuous, or semi-continuous operations and employing one or more actual or theoretical stages.

The following specific examples are offered to illustrate the invention but not necessarily to place limitations on the same.

Example I 100 grams of a mixture of methylene chloride and neohexane (75 weight percent methylene chloride and 25 weight percent neohexane) were mixed with 100 grams of $\beta,\beta'$-oxydipropionitrile at 24° C. and after agitation the heterogeneous mixture was separated into two phases. The lower or extract phase weighed 168.2 grams and contained 59.4% by weight of solvent, 38.6% methylene chloride, and 2% neohexane. The upper or raffinate phase weighed 31.8 grams and contained 68% by weight of neohexane, 31.8% of methylene chloride, and 0.2% of solvent. Thus in one extraction stage with a 1:1 solvent to feed mixture, the methylene chloride concentration of the feed was reduced from 75% to 31.8%.

Example II

A methylene chloride-neohexane mixture (containing 33.3% by weight of methylene chloride and 66.7% of neohexane) was agitated with $\beta,\beta'$-oxydipropionitrile at 24° C. The solvent was employed in the amount of 0.67 part by weight per part of the methylene chloride-neohexane feed mixture. After agitation of the mixture, it was separated into two phases. The extract phase contained 78.8% solvent, 23.2% methylene chloride, and no neohexane. The raffinate phase contained 87.7% neohexane, 16.3% methylene chloride, and essentially no solvent.

Calculations have shown that complete separation of a methylene chloride-neohexane azeotrope (containing about 75 weight percent methylene chloride) can be effected in a continuous countercurrent extraction in about two theoretical stages with a solvent to feed ratio of 2.5.

The methylene chloride can be readily separated from the selective solvents employed herein because of the vast differences in boiling points. Methylene chloride has a boiling point of about 40° C. whereas the selective solvents have much higher boiling points as indicated earlier herein. The recovered methylene chloride can then be used in the azeotropic distillation of dimethylbutanes from methylpentanes and n-hexane, as indicated earlier herein, and the overhead azeotrope of methylene chloride and dimethylbutanes can be solvent extracted with the recovered solvent. The solvents employed herein may also be used in a similar manner to solvent extract tertiary butyl chloride from paraffinic hydrocarbons, and find special utility for separating tertiary butyl chloride from azeotropic mixtures thereof with dimethylbutanes.

While the invention has been described with respect to certain solvents and the separation of particular mixtures, equivalent variations thereof will be apparent to those skilled in this art and are intended as coming within the scope of the appended claims.

We claim:

1. A process for the selective separation of methylene chloride from a methylene chloride-paraffinic hydrocarbon mixture which process comprises selectively extracting said mixture with a liquid solvent corresponding to the formula

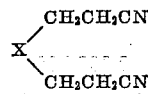

wherein X is an atom selected from the group consisting of oxygen and sulfur.

2. The process of claim 1 wherein the solvent is $\beta,\beta'$-oxydipropionitrile.

3. The process of claim 1 wherein an azeotropic mixture of methylene chloride with a paraffinic hydrocarbon is contacted with the liquid solvent.

4. The method of claim 1 wherein a mixture of methylene chloride and dimethylbutane is contacted with the liquid solvent.

5. The method of claim 4 wherein the liquid solvent is $\beta,\beta'$-oxydipropionitrile.

6. A process for separating methylene chloride from a methylene chloride-dimethylbutane mixture which process comprises contacting said mixture with liquid $\beta,\beta'$-oxydipropionitrile solvent in the amount of between 0.5 to 5 volumes of solvent per volume of methylene chloride-dimethylbutane mixture, forming separate extract and raffinate phases, and separating an extract phase of solvent containing dissolved methylene chloride from a raffinate phase containing dimethylbutane.

References Cited in the file of this patent

Medcalf et al.: Petroleum Refiner, vol. 30, issue 7, pp. 97–100, July 1951.